United States Patent [19]

Allen et al.

[11] Patent Number: 4,722,650

[45] Date of Patent: Feb. 2, 1988

[54] HOT MELT ADHESIVE COMPOSITION FOR BOOK CASEMAKING

[75] Inventors: Scott M. Allen, Midlothian, Va.; Thomas P. Flanagan, Green Brook, N.J.

[73] Assignee: National Starch and Chemical Corporation, Bridgewater, N.J.

[21] Appl. No.: 831,244

[22] Filed: Feb. 19, 1986

[51] Int. Cl.$^4$ .............................................. B42C 7/00
[52] U.S. Cl. ...................................... 412/3; 156/908; 281/29
[58] Field of Search ................. 156/908; 412/3, 4; 281/29

[56] References Cited

U.S. PATENT DOCUMENTS

| | | |
|---|---|---|
| 3,137,874 | 6/1964 | Hildmann et al. ............. 156/908 |
| 3,239,478 | 3/1966 | Harlan ............................ 260/27 |
| 3,244,436 | 4/1966 | McKowen ..................... 156/908 |
| 3,837,994 | 9/1974 | Flanagan et al. .............. 161/100 |
| 3,964,769 | 6/1976 | Snatzkin ........................ 156/908 |
| 4,019,758 | 4/1977 | Heller et al. .................. 281/21 R |
| 4,091,487 | 5/1978 | Axelrod ........................ 11/1 AD |
| 4,184,218 | 1/1980 | Hawkes ......................... 156/908 |
| 4,187,572 | 2/1980 | Savich ............................. 11/2 |
| 4,248,657 | 2/1981 | Henry ............................ 156/908 |
| 4,374,441 | 2/1983 | Carter et al. .................... 412/3 |
| 4,405,156 | 9/1983 | Carter et al. .................. 281/29 |
| 4,420,282 | 12/1983 | Axelrod ........................... 412/4 |
| 4,526,577 | 7/1985 | Schmidt et al. ................ 604/366 |
| 4,536,012 | 8/1985 | Hume .......................... 281/21 R |
| 4,565,477 | 1/1986 | Axelrod ............................ 412/5 |
| 4,615,541 | 10/1986 | Kwauka ............................ 412/3 |

OTHER PUBLICATIONS

U.S. Ser. No. 749,341 filed 06/27/85, (now allowed). Copy will be sent on issue.
"Bookbinding", James B. Blaine, presented by Book Production Magazine; Freund Publishing Co., Inc., New York, N.Y.
"A New Look at Animal Glue for Casemaking", Nathan B. Leitner; Marketing Manager-Bookbinding/Graphic Arts, H. B. Fuller Company.
"Book Cover Warping", by the Book Manufacturing Institute, Spring 1985.
"Stereon® 840A for Hot Melt Adhesives Applications", Firestone Synthetic Rubber & Latex Company, Technical Serive Report 1/14/86.
Good Tack and Open Time Help Animal Glue Hold Market Share", Adhesives Age, Jun. 1987.

Primary Examiner—Paul A. Bell
Attorney, Agent, or Firm—Ellen G. Dec; Edwin M. Szala

[57] ABSTRACT

A case or cover for a hard bound book is formed by bonding the formed by bonding the cover boards to the book cover stock using a hot melt pressure sensitive adhesive composition comprising:

(a) 20 to 35% by weight of an A-B-A block or A-B-A-B-A-B multi-block copolymer where the A component is styrene and the B component is butadiene or hydrogenated butadiene and the copolymer contains at least 28 parts styrene per 100 parts copolymer;
(b) 45 to 70% by weight of a compatible tackifying resin;
(c) 5 to 30% by weight of a plasticizing oil;
(d) 0 to 5% by weight of a petroleum derived wax; and
(e) 0.1 to 2% by weight of a stabilizer.

17 Claims, No Drawings

HOT MELT ADHESIVE COMPOSITION FOR BOOK CASEMAKING

BACKGROUND OF THE INVENTION

The present invention is directed to a process for the production of a case or cover for a hard bound book utilizing a specific class of hot melt pressure sensitive adhesives.

Casemaking is a series of carefully synchronized procedures for making the cover of a hard bound book. In general, the material that will form the outer covering of the book, in precut or continuous web form is coated with adhesive, passed along a a conveyer under boards which have been precut to the exact size of the finished book cover, the boards are dropped in place and a center strip is laid down between the boards. If the cloth was not precut, it is then cut and, in either case, a portion of the cloth extends about ⅜ inch around the perimeter of the cover boards. This extension is then folded over the boards in a two step "turning-in" process with the sides folded first and the end folded to lap over the sides.

The adhesive used in order to construct the book cover or book case must possess certain critical properties. Because the operation is a multi-step one, the adhesive chosen must have a relatively long period of agressive tack so as to retain sufficient tack to instantly hold down the folded extensions without allowing them to spring back during the turning-in step. In addition to its agressive tack, the adhesive selected must have good machining properties, and it should be able to adhere a wide variety of case stock materials. Furthermore, once the case is formed, the adhesive must not penetrate the stock which would ruin the cover nor may it be affected by moisture, which could cause warping of the cover.

Heretofore animal glues have been the principal adhesives used for casemaking. These adhesives are, however, sensitive to moisture and are restricted in their use to a limited range of cover stocks. While some attempts have been made to use ethylene vinyl acetate hot melt adhesives that have been specially formulated to extend their open time, these adhesives have not met with success on a commercial scale.

It is therefore an object of the present invention to provide an adhesive suitable for use in case making operations, the adhesive being characterized by a long period of agressive tack, good machining properties and heat and moisture resistance.

It is a further object of the invention to provide such an adhesive which may be used on a wide variety of difficult to bond cover stocks.

These and other objects will be apparent from the description that follows.

SUMMARY OF INVENTION

We have now found that pressure sensitive hot melt compositions prepared from A-B-A type block and multi-block copolymers are particularly useful in the casemaking operations.

Thus, the present invention is directed to a case or cover for a hard bound book formed by bonding the cover boards to the book cover stock using a hot melt pressure sensitive adhesive composition comprising:

(a) 20 to 35% by weight of an A-B-A block or A-B-A-B-A-B multi-block copolymer where the A component is styrene and the B component is butadiene or hydrogenated butadiene and the copolymer contains at least 28 parts styrene per 100 parts copolymer;

(b) 45 to 70% by weight of a compatible tackifying resin;

(c) 5 to 30% by weight of a plasticizing oil;

(d) 0 to 5% by weight of a petroleum derived wax; and (e) 0.1 to 2% by weight of a stabilizer.

More particularly, the present invention is directed to the use of a hot melt adhesive composition especially adapted for the above described construction the hot melt adhesives containing as the block copolymer a multi-block styrene-butadiene copolymer containing at least 35 parts styrene per 100 parts copolymer.

DETAILED DESCRIPTION OF THE PREFERRED EMBODIMENTS

The primary component of the adhesive compositions used in the present invention are block or multi-block copolymers having the general configuration:

A-B-A or A-B-A-B-A-B- wherein the polymer blocks A are non-elastomeric styrene blocks, while the elastomeric polymer blocks B are butadiene or butadiene which is partially or substantially hydrogenated as taught, for example, in U.S. Pat. No. 3,700,633. Selected conditions may be employed for example to hydrogenate the elastomeric butadiene block while not so modifying the styrene polymer blocks. Other conditions may be chosen to hydrogenate substantially uniformly along the polymer chain, both the elastomeric and non-elastomeric blocks thereof being hydrogenated to practically the same extent, which may be either partial or substantially complete. Further, they may be linear or branched. Typical branched structures contain an elastomeric portion with at least three branches which can radiate out from a central hub or can be otherwise coupled together.

Typical of the rubbery copolymers useful herein are the polystyrene-polybutadiene-polystyrene, and e.g. polystyrene-poly-(ethylenebutylene)-polystyrene.
These copolymers may be prepared using methods taught, for example, in U.S. Pat. Nos. 3,239,478; 3,427,269; 3,700,633; 3,753,936; and 3,932,327. Alternatively, some may be obtained from Shell Chemical Co. under the trademarks Kraton 1101, 1102, 1650, 1652 and 1657 and from Phillips Chemical Co. under the trademarks Solprene 418 and 423.

Most preferred for use herein are the linear A-B-A-B-A multi-block copolymers where the elastomeric block is butadiene and the non-elastomeric block is styrene and the latter is present in relatively high concentrations, i.e. at levels of 35% or above. Block copolymers marketed commercially at this time which meet the above described requirements are available from Firestone under the tradenames Stereon 840A (57 parts butadiene and 43 parts styrene) and Stereon SR 7092 (50 parts butadiene and 50 parts Styrene). Blends of these high styrene containing copolymers with other compatable block copolymers may also be employed.

The tackifying resins useful in the adhesive compositions can be hydrocarbon resins, synthetic polyterpenes, rosin esters, natural terpenes, and the like. More particularly, the useful tackifying resins include any compatible resins or mixtures thereof such as (1) natural and modified rosins such, for example, as gum rosin, wood rosin, tall oil rosin, distilled rosin, hydrogenated rosin, dimerized rosin, and polymerized rosin; (2) glycerol and pentaerythritol esters of natural and modified rosins, such, for example as the glycerol ester of pale, wood rosin, the glycerol ester of hydrogenated rosin, the glycerol ester of the phenolic-modified pentaerythritol ester of rosin; (3) copolymers and terpolymers of natured terpenes, e.g. styrene/terpene and alpha methyl styrene/terpene; (4) polyterpene resins having a softening point, as determined by ASTM method E28-58T, of from about 80° to 150° C.; the latter polyterpene resins generally resulting from the polymerization of terepene hydrocarbons, such as the bicylic monoterpene known as pinene, in the presence of Friedel-Crafts catalysts at moderately low temperatures; also included are the hydrogenated polyterpene resins; (5) phenolic modified terpene resins and hydrogenated derivatives thereof such, for example, as the resin product resulting from the condensation, in an acidic medium, of a bicyclic terpene and a phenol; (6) aliphatic petroleum hydrocarbon resins having a Ball and Ring softening point of from about 70° to 135° C.; the latter resins resulting from the polymerization of monomers consisting of primarily of olefins and diolefins; also included are the hydrogenated aliphatic petroleum hydrocarbon resins; (7) aromatic petroleum hydrocarbon resins and the hydrogenated derivatives thereof; and (8) alicyclic petroleum hydrocarbon resins and the hydrogenated derivatives thereof. Mixtures of two or more of the above described tackifying resins may be required for some formulations.

The selection of the particular tackifying agent is, in large part, dependent upon the specific block copolymer employed. The preferred adhesive formulations for use herein which employ the linear multi-block Stereon type copolymers provide optimum properties when tackifiers of modified terpene having ring and ball softening point of about 100°–120° C. such as Zonatac 105 are employed.

Among the applicable stabilizers or antioxidants utilized herein are included high molecular weight hindered phenols and multifunctional phenols such as sulfur and phosphorous-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy group. The presence of these sterically bulky substituted radicals in the vicinity of the hydroxyl group serves to retard its stretching frequency and, correspondingly, its reactivity; this steric hindrance thus providing the phenolic compound with its stabilizing properties. Representative hindered phenols include: 1,3,5-trimethyl 2,4,6-tris (3,5-di-tert-butyl-4-hydroxybenzyl)benzene; pentaerythrityl tetrakis-3(3,5-di-tert-butyl-4-hydroxybenzyl)propionate; n-octadecyl-3 (3,5-di-tert-butyl-4-hydroxyphenyl)-propionate; 4,4'-methylenbis (2,6-tert-butylphenol); 4,4'-thiobis (6-tert-butyl-o-cresol); 2,6-di-tertbutylphenol; 6-(4-hydroxyphenoxy)-2,4-bis(n-octyl-thio)-1,3,5-triazine; di-n-octadecyl 3,5-di-tert--butyl-4-hydroxy-benzylphosphonate; 2-(n-octylthio)ethyl 3,5-di-tert-butyl-4-hydroxy-benzoate; and sorbitol hexa[3-(3,5-di-tert-butyl-4-hydroxyphenyl)-propionate].

The performance of these antioxidants may be further enhanced by utilizing, in conjunction therewith known synergists such, for example, as thiodipropionate esters and phosphites, particularly useful is distearylthiodipropionate.

These stabilizers, if used, are generally present in amounts of about 0.1 to 1.5 weight percent, preferably 0.25 to 1.0%.

Various plasticizing or extending oils are also present in the composition in amounts of 5% to about 30%, preferably 5 to 25%, by weight in order to provide wetting action and/or viscosity control. The above broadly includes not only the usual plasticizing oils but also Various plasticizing or extending oils are also present in the composition in amounts of 5% to about 30%, preferably 5 to 25%, by weight in order to provide wetting action and/or viscosity control. The above broadly includes not only the usual plasticizing oils but also contemplates the use of olefin oligomers and low molecular weight polymers as well as vegetable and animal oil and their derivatives. The petroleum derived oils which may be employed are relatively high boiling materials containing only a minor proprotion of aromatic hydrocarbons (preferably less than 30% and, more particularly, less than 15% by weight of the oil). Alternatively, the oil may be totally non-aromatic. The oligomers may be polypropylenes, polybutenes, hydrogenated polyisoprene, hydrogenated polybutadiene, or the like having average molecular weights between about 350 and about 10,000. Vegetable and animal oils include glyceryl esters of the usual fatty acids and polymerization products thereof.

Various petroleum derived waxes may also be used in amounts less than about 15% by weight of the composition in order to impart fluidity in the molten condition of the adhesive and flexibility to the set adhesive, and to serve as a wetting agent for bonding cellulosic fibers. The term "petroleum derived wax" includes both paraffin and microcrystalline waxes having melting points within the range of 130°–225° F. as well as synthetic waxes such a low molecular weight polyethylene or Fisher-Tropsch waxes.

Additionally there may be added to the hot melt adhesive composition up to about 10% by weight of an ethylene vinyl acetate copolymer containing 17 to 42% vinyl acetate as a reinforcing agent and/or to promote adhesion to certain substrates. The adhesive compositions are prepared by blending the components in the melt at a temperature of about 130°–200° C. until a homogeneous blend is obtained, approximately 2 hours. Various methods of blending are known to the art and any method that produces a homogeneous blend is satisfactory.

The resultant adhesives are then used in casemaking operations to bond the cover boards to the cover stock. The cover board or binders board are generally chip board that has been compressed to give a high bursting strength board, sometimes designated chestnut cover board. As noted previously, the hot melt adhesives used herein allow production of cases without limitation to the type of cover stock or cloth used. Thus, the book cover fabric chosen may include paper cloth, woven fabric, pryoxylin, vinyl or other resin impregnated or coated fabric. In addition a synthetic material comprising a spunbonded olefin of high density polyethylene fibers available from E. I. DuPont de Nemours and Co., Inc. under the tradename Tyvec may be used.

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

We claim:

1. A case for a hard cover book formed by bonding the cover boards to the book cover stock using a hot melt pressure sensitive adhesive composition comprising:
   (a) 20 to 35% by weight of an A-B-A block or A-B-A-B-A-B multi-block copolymer where the A component is styrene and the B component is butadiene or hydrogenated butadiene and the copolymer contains at least 28 parts styrene per 100 parts copolymer;
   (b) 45 to 70% by weight of a compatible tackifying resin;
   (c) 5 to 30% by weight of a plasticizing oil;
   (d) 0 to 5% by weight of a petroleum derived wax; and
   (e) 0.1 to 2% by weight of a stabilizer.

2. The case of claim 1 wherein the tackifier in the hot melt adhesive composition is any compatible resin or mixture thereof selected from the group consisting of (1) natural and modified rosins: (2) glycerol and pentaerythritol esters of natural and modified rosins; (3) copolymers and terpolymers of natured terpenes; (4) polyterpene resins having a softening point, as determined by ASTM method E28-58T, of from about 80° to 150° C.; (5) phenolic modified terpene resins and hydrogenated derivatives thereof; (6) aliphatic petroleum hydrocarbon resins having a Ball and Ring softening point of from about 70° to 135° C.; (7) aromatic petroleum hydrocarbon resins and the hydrogenated derivatives thereof; and (8) alicyclic petroleum hydrocarbon resins and the hydrogenated derivatives thereof.

3. The case of claim 1 wherein there is additionally present in the hot melt adhesive up to 10% of an ethylene vinyl acetate copolymer containing 17 to 42% vinyl acetate.

4. The case of claim 1 wherein the cover board is chestnut cover board.

5. The case of claim 1 wherein the cover stock is selected from the group consisting of paper cloth, woven fabric, pyroxylin, vinyl impregnated on coated stock and spun bonded high density polyethylene.

6. A case for a hard cover book formed by bonding the cover boards to the book cover stock using a hot melt pressure sensitive adhesive composition comprising:
   (a) 20 to 35% by a weight of an A-B-A-B-A-B multi-block copolymer wherein the A component is styrene and the B component is butadiene and wherein the styrene component is present in an amount of at least 35 parts per 100 parts of the copolymer;
   (b) 45 to 70% by a weight of a compatible tackifying resin;
   (c) 5 to 30% by weight of a plasticizing oil;
   (d) 0 to 5% by a weight of a petroleum derived wax; and
   (e) 0.1 to 2% by weight of a stabilizer.

7. The case of claim 6 wherein the block copolymer in the adhesive comprises 57 parts butadiene and 43 parts styrene.

8. The case of claim 6 wherein the block copolymer in the adhesive comprises 50 parts butadiene and 50 parts styrene.

9. The case of claim 6 wherein the tackifier in the hot melt adhesive composition is any compatible resin or mixture thereof selected from the group consisting of ((1) natural and modified rosins: (2) glycerol and pentaerythritol esters of natural and modified rosins; (3) copolymers and terpolymers of natured terpenes; (4) polyterpene resins having a softening point, as determined by ASTM method E28-58T, of from about 80° to 150° C.; (5) phenolic modified terpene resins and hydrogenated derivatives thereof; (6) aliphatic petroleum hydrocarbon resins having a Ball and Ring softening point of from about 70° to 135° C.; (7) aromatic petroleum hydrocarbon resins and the hydrogenated derivatives thereof; and (8) alicyclic petroleum hydrocarbon resins and the hydrogenated derivatives thereof.

10. The case of claim 9 wherein the tackifying resin in the adhesive is a modified terpene resin having a Ring and Ball softening part of about 100°–120° C.

11. The case of claim 9 wherein the tackifying resin in the adhesive is an aromatic petroleum hydrocarbon resin or hydrogenated derivative thereof.

12. The case of claim 6 wherein there is additionally present in the hot melt adhesive up to 10% of an ethylene vinyl acetate copolymer containing 17 to 42% vinyl acetate.

13. In a process for the production of a book case wherein the cover boards are bonded to the cover stock, the improvement which comprises using a hot melt pressure sensitive adhesive comprising:
   (a) 20 to 35% by weight of an A-B-A block or A-B-A-B-A-B multi-block copolymer wherein the A component is styrene and the B component is butadiene or hydrogenated butadiene and the copolymer contains at least 28 parts styrene per 100 parts copolymer;
   (b) 45 to 70% by weight of a compatible tackifying resin;
   (c) 5 to 30% by weight of a plasticizing oil;
   (d) 0 to 5% by weight of a petroleum derived wax; and
   (e) 0.1 to 2% by weight of a stabilizer.

14. The process of claim 13 wherein the block copolymer in the adhesive is an A-B-A-B-A-B multiblock containing at least 35 parts styrene plus 100 parts copolymer.

15. The process of claim 13 wherein there is additionally present in the hot melt adhesive up to 10% of an ethylene vinyl acetate copolymer containing 17 to 42% vinyl acetate.

16. The process of claim 13 wherein the cover board is chestnut cover board.

17. The process of claim 13 wherein the cover stock is selected from the group consisting of paper cloth, woven fabric, pyroxylin, vinyl impregnated or coated stock and spun bonded high density polyethylene.

* * * * *